March 6, 1928.　　　　　　　S. QUISLING　　　　　　　1,661,910
ANTISKID DEVICE
Filed Jan. 24, 1927
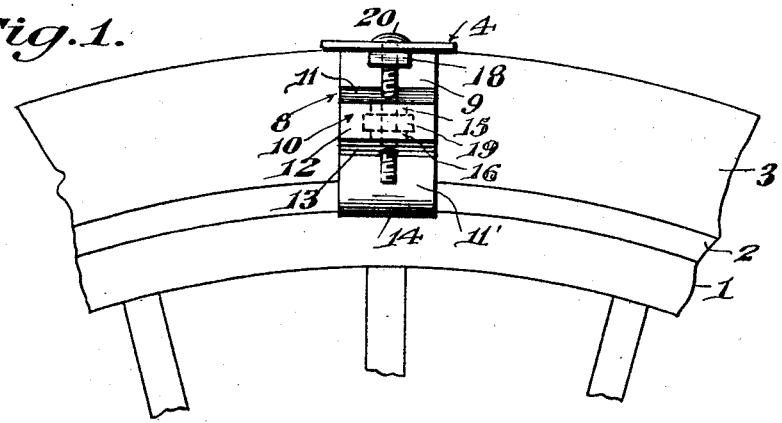
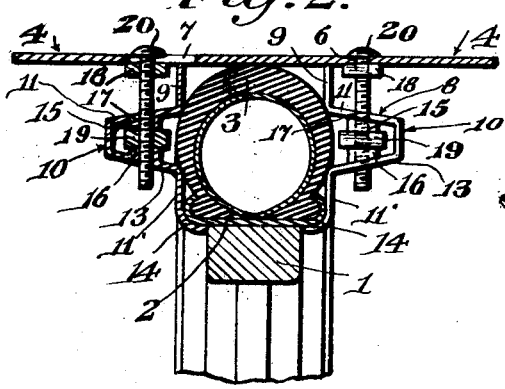
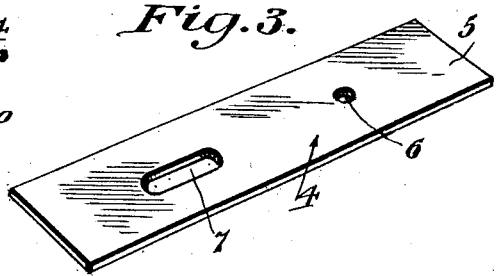
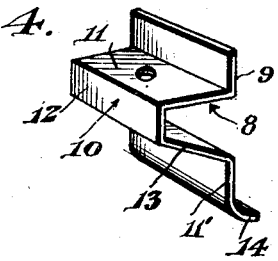
INVENTOR.
*Sverre Quisling,*
BY
*Geo. F. Kimmel*　　ATTORNEY.

Patented Mar. 6, 1928.

1,661,910

UNITED STATES PATENT OFFICE.

SVERRE QUISLING, OF MADISON, WISCONSIN.

ANTISKID DEVICE.

Application filed January 24, 1927. Serial No. 163,189.

This invention relates to an anti-skid device for use in connection with the tread of a pneumatic tired wheel, and has for its object to provide, in a manner as hereinafter set forth, a device of such class for preventing slipping and miring of wheeled vehicles, to grip the ground in a manner to lift the vehicle from ruts or muddy portions of a road, and to increase the tread of the wheel which will tend to raise the wheel from a rut and also increase friction for forward motion.

Further objects of the invention are to provide, in a manner as hereinafter set forth, an anti-skid device for vehicle wheels which can be expeditiously applied, and further which is strong, durable, thoroughly efficient in its use, comparatively inexpensive to manufacture and applicable to varying sizes of tires and wheels.

With the foregoing and other objects in view the invention consists of the novel construction, combination and arrangement of parts, as hereinafter more specifically described and illustrated in the accompanying drawings, wherein are shown embodiments of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view in side elevation, of a wheel, showing the adaptation therewith of an anti-skid device with this invention.

Figure 2 is a cross sectional view thereof.

Figure 3 is a perspective view of a tread element.

Figure 4 is a perspective view of a connector element.

Referring to the drawing, 1 denotes the felloe of a wheel, 2 a rim and 3 a pneumatic tire connected to the rim 2. The foregoing elements are of known construction.

The anti-skid device includes a tread element or member referred to generally by the reference character 4 and constructed from a rigid metallic bar 5 of rectangular form and of the desired length, width and gauge. The bar 5 is of materially greater length than the diameter of the tire 3 whereby when the element 4 is mounted in position, it will extend laterally in both directions with respect to the sides of the tire 3. The element or member 4 is positioned, when in use, against the periphery of the tread of the tire 3. The bar 5 between its transverse center and one end is formed with an opening 6 at the longitudinal center thereof, and said bar 5, at a point between its transverse median and its other end thereof, is formed with a lengthwise disposed slot 7 positioned at the longitudinal median of the bar 5. The slot 7 permits for the adjustment of one, of a pair of coupling devices to be presently referred to, so that the element 4 can be employed in connection with varying sizes of tires.

The device as shown includes a pair of connector members and which are oppositely disposed with respect to each other and are arranged at each side of the tire 3. As each of the connector members is of the same construction, but one will be described, as the description of one will apply to the other. Each connector member is referred to generally by the reference character 8 and it is constructed from a length of sheet metal of the desired gauge. Each connector member consists of an outer part 9 an intermediate part 10 and an inner part 11. The intermediate part 10 is of V-shape in cross section and comprises an outer wall 11, a side wall 12 and an inner wall 13. The walls 11 and 13 extend towards and are adapted to have their inner ends abut against one side of the tire 3. The inner end of the wall 13 terminates in the outer part 9 which extends outwardly towards the tread element 4. The inner end of wall 13 terminates in an inwardly directed inner part 11 having a free curved terminal portion 14 which extends around the rim 2. The walls 11 and 13 are provided with aligning openings 15 and aligning apertured bosses 16 arranged in opposed spaced relation.

As each pair of coupling devices is of the same construction, but one will be described as the description thereof will apply to both. Each of said coupling devices consists of a screw threaded bolt 17 carrying a pair of nuts 18, 19. The nut 19 is arranged on the bolt 17 between the pair of bosses 16. The nut 18 is arranged on the bolt 17 and positioned against the inner face of the bar 5. The head of the bolt 17 is indicated at 20 and is arranged against the outer face of the bar 5. One of the bolts 17 extends through the opening 6 and the other bolt 17 extends through the slot 7. The coupling devices, may also be termed clamping devices, as they provide means for clamping the tread element 4 against the outer part 9 of the connector members and further provide means for coupling the element 4 to the connector members.

The slot 7, as before stated permits of adjustably securing one of the coupling devices to the tread element 4 so that provision is had whereby the element 4 can be employed in connection with different sizes of tires. The bolt which extends through the slot 7 can be shifted lengthwise thereof to provide for the adjustment referred to. The coupling devices also provide means for clamping the connector members to the rim 2.

It is thought the many advantages of an anti-skid device, in accordance with this invention, can be readily understood, and although the preferred embodiment of the invention is as illustrated and described, yet it is to be understood that changes in the details of construction can be had which will fall within the scope of the invention as claimed.

What I claim is:

1. In an anti-skid device for tires a flat rectangular tread element for positioning against the tire tread and of a length to project laterally in both directions with respect to the sides of the tire, said element provided with an opening and a slot arranged in spaced relation, a pair of oppositely extending connecting means for abutting respectively against the inner face of the tread element, rear face of a wheel rim and opposite sides of a felloe, means extending through one of said connecting means and with said opening for securing one end of said element in position, and means extending through the other of said connecting means and with said slot for securing the other end of the element in position, said slot providing for the adjustment of the last mentioned means.

2. In an anti-skid device for tires a flat rectangular tread element for positioning against a tire tread and of a length to project laterally in both directions with respect to the sides of the tire, said element provided with an opening and a slot arranged in spaced relation, a pair of oppositely extending connecting means for abutting respectively against the inner face of the tread element, rear face of a wheel rim and opposite sides of a felloe, means extending through one of said connecting means intermediate the ends thereof and through said opening for securing one end of said tread element in position, and means extending through the other of said connecting means intermediate the ends thereof and through said slot for securing the other end of the tread element in position, said slot providing for the adjustment of the last mentioned means.

3. In an anti-skid device for tires a flat rectangular tread element for positioning against a tire tread and of a length to project laterally in both directions with respect to the sides of the tire, a pair of oppositely disposed connector members for abutting respectively against said element, the rear face of a tire rim and opposite sides of a felloe each of said members formed with a laterally disposed compressible intermediate portion substantially V-shaped, and means extending through said element and said intermediate portions for securing said members and elements in position.

In testimony whereof, I affix my signature hereto.

SVERRE QUISLING.